(No Model.) 2 Sheets—Sheet 1.
M. PRENTICE.
PROCESS OF MAKING NITRIC ACID.
No. 526,116. Patented Sept. 18, 1894.
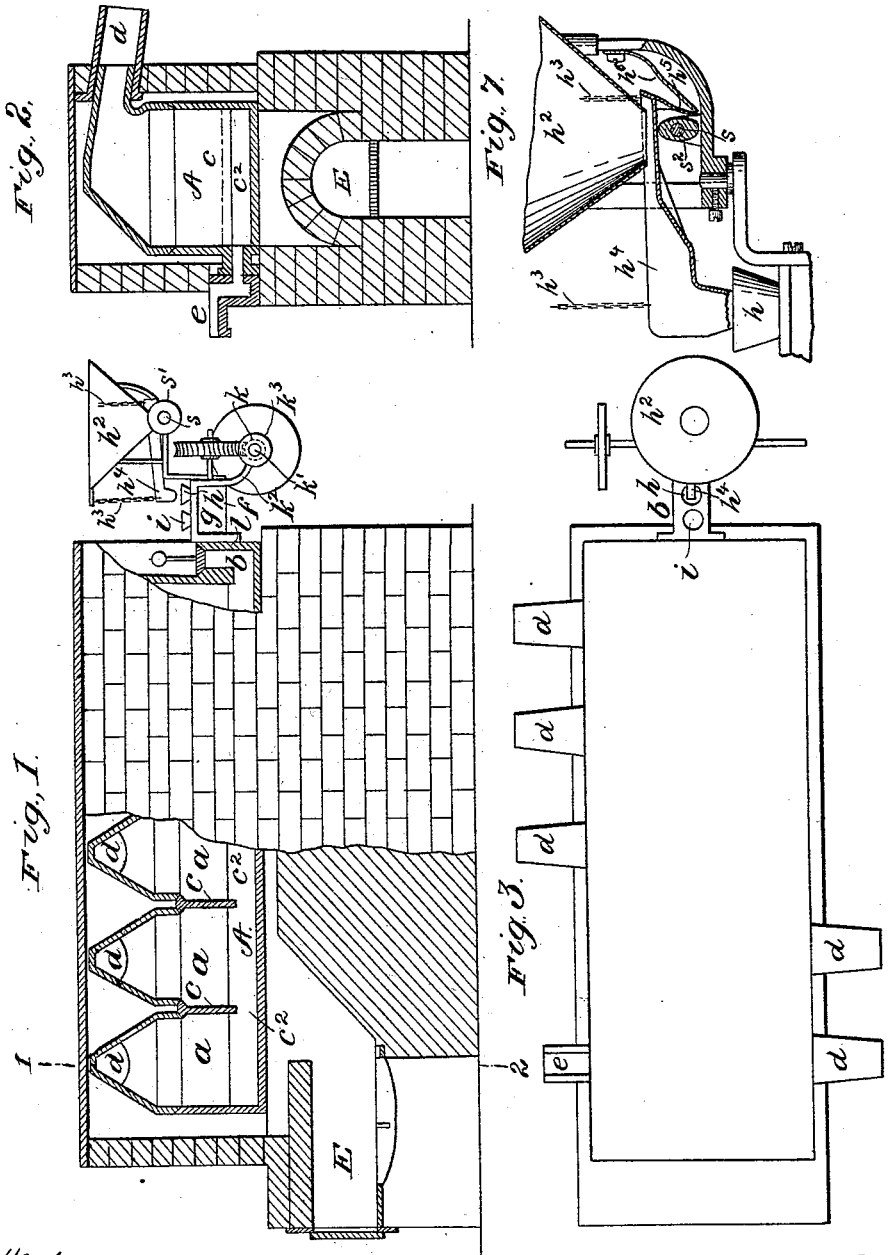

(No Model.) 2 Sheets—Sheet 2.
M. PRENTICE.
PROCESS OF MAKING NITRIC ACID.
No. 526,116. Patented Sept. 18, 1894.
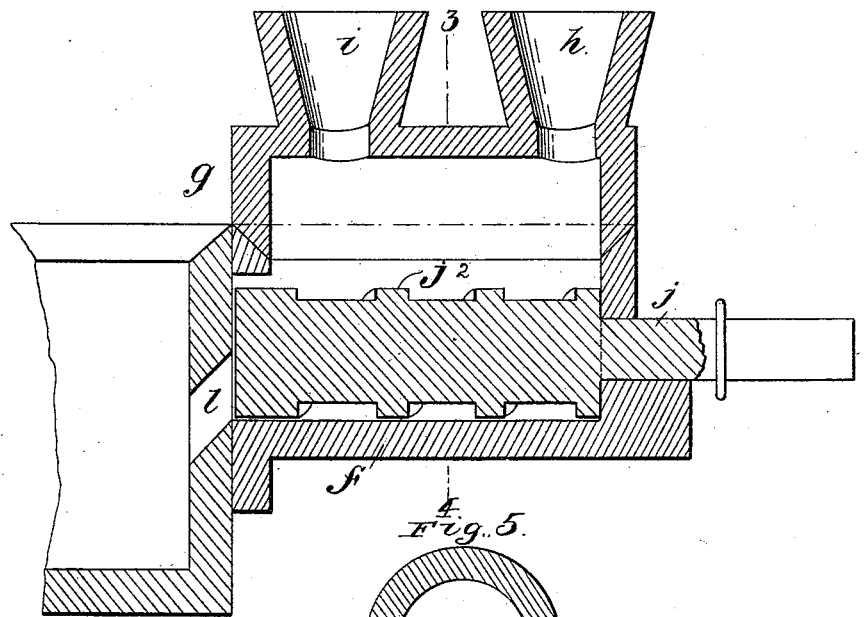
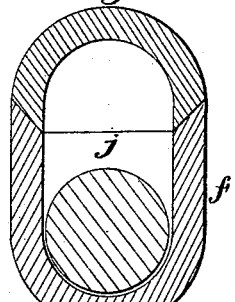
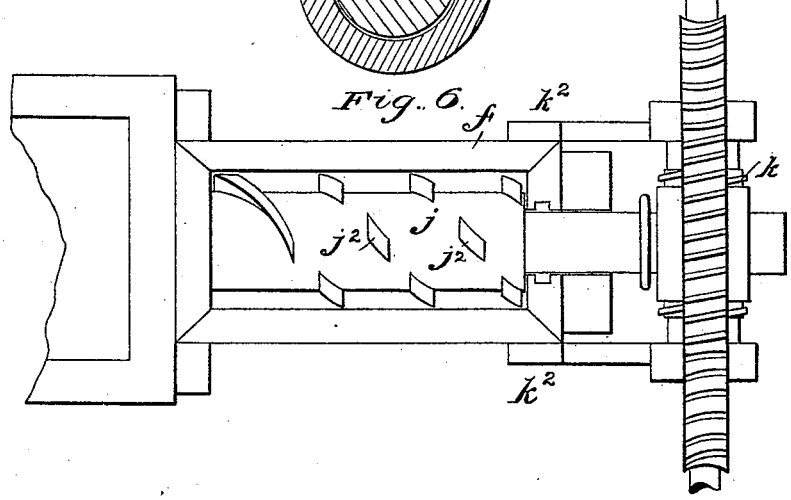

UNITED STATES PATENT OFFICE.

MANNING PRENTICE, OF STOWMARKET, ENGLAND.

PROCESS OF MAKING NITRIC ACID.

SPECIFICATION forming part of Letters Patent No. 526,116, dated September 18, 1894.

Application filed October 10, 1893. Serial No. 487,766. (No specimens.)

*To all whom it may concern:*

Be it known that I, MANNING PRENTICE, manufacturing chemist, a subject of the Queen of Great Britain and Ireland, residing at Woodfield, Stowmarket, in the county of Suffolk, England, have invented certain Improvements in the Manufacture of Nitric Acid, of which the following is a specification.

My invention has for its object to manufacture nitric acid by a continuous process instead of by the intermittent process hitherto employed for the purpose.

The method hitherto used for the production of nitric acid has been to place about ten hundred-weight of nitrate of soda with from twelve hundred-weight to twenty hundred-weight of sulfuric acid in a large iron still weighing about six tons and apply heat to this until nitric acid is produced and distills over. The still has then to cool and to be cleared out, when the process is repeated, the operation requiring from twenty-six to forty-eight hours. This process is inconvenient, costly and takes an objectionably long time and the alternate heating and cooling wastes heat and destroys apparatus.

According to my invention I provide a still or vessel, in which the nitrate and acid are subjected to heat the said still or vessel being provided with an inlet for the admission of the nitrate and acid and siphon or other suitable outlet for the bi-sulfate, niter cake or other residue and an outlet or outlets for the nitric acid from above the fluid mixture passing through the said still or vessel.

I may divide the still or vessel into separate compartments or into a number of separate chambers distinct from each other as regards the portions above the fluid mixture undergoing distillation, but communicating with each other at their lower parts so that the nitrate and acid pass continuously or intermittently by the inlet therefor, into the first compartment, or chamber and thence into the succeeding compartment or chamber or compartments or chambers, the bi-sulfate or other residue passing off by the outlet while the nitric acid distilled off from each compartment or chamber is led off by the outlet therefor provided from each compartment or chamber.

I do not limit myself to a particular construction of apparatus in which to carry out my invention but an apparatus such as is described in the specification of my application filed October 10, 1893, Serial No. 487,765, is suitable for the purpose. Such an apparatus is illustrated in the accompanying drawings in which—

Figure 1 is a longitudinal section thereof. Fig. 2 is a transverse section on the line 1—2 of Fig. 1 and Fig. 3 is a plan. Fig. 4 is a longitudinal section of an arrangement for mixing and feeding the matter to be distilled into the distilatory apparatus. Fig. 5 is a section on the line 3—4, Fig. 4. Fig. 6 is a plan view with the cover removed and Fig. 7 is a sectional detail of the hopper, trough and accessory parts.

Referring to the drawings A represents the still or vessel provided with the inlet $b$ for the matter to be distilled and with the outlet $e$ for the matter after distillation to pass off.

$c$ are partitions of which each extends from side to side of the still or vessel A and leaves a space $c^2$ between its lower edge and the bottom of the still or vessel A dividing the upper part of the still or vessel A into compartments $a$. I do not limit myself to the particular number of compartments shown.

$d$ are the outlets from each compartment; $a$, for the volatile constituents driven off by the heat which is shown as being applied to the still or vessel A by the furnace E, although I do not limit myself to that mode of applying the heat as it may be applied in any other suitable way.

The upper part of the still is shown as being inclosed in a surrounding casing constituting a hot air chamber into which the gases from the furnace pass. If it be desired to obtain products from each compartment which are driven off at different temperatures the compartments may be heated by providing each with separate furnaces or heating appliances or by so arranging the flue or flues from the furnace or furnaces that the heated products therefrom are, as they pass in proximity to the several compartments, heated at the requisite temperatures to impart to them the heat necessary to drive off the volatile constituents required from each.

The liquid being distilled is maintained at such a height in the still or vessel A that it seals the openings $c^2$ beneath the partitions $c$ keeping the upper parts of the compartments $a$ separate from each other so that the volatile constituents can be separately obtained at the outlets $d$ from each compartment. If the matter to be distilled be supplied by the inlet $b$, as the liquid after distillation is drawn off at the outlet $e$ the process of distillation can be carried on continuously.

For mixing and feeding the material into the still I have shown a device consisting of a casing provided with a cover $g$ the meeting edges of the casing and cover being inclined to give a tight closure by the weight of the cover causing it to seat itself securely on the casing.

$h$ is the inlet by which the materials to be distilled are fed into the casing from the hopper $h^2$ by a spout or trough $h^4$ and $i$ is an outlet for the escape of any gas generated therein.

The trough $h^4$ is supported from the hopper by flexible connections $h^3$ and is provided with a depending arm $h^5$ engaged at one side by a spring $h^6$. A shaft $s$ extending transversely to the trough in front of the arm $h^5$ is supported in suitable bearings on the frame work. This shaft carries at one end a pulley $s'$ through which motion is received from a pulley $k^3$ on the worm shaft $k'$, and is also provided with a cam $s^2$ arranged to engage the arm $h^5$ which cam co-operates with the spring $h^6$ to oscillate the spout to feed the material to the mixer.

$j$ is a feed roll provided with feeders and breakers $j^2$ which are helically arranged and are shown as being non-continuous, but they may be continuous if desired. The feed roll is rotated from any suitable motor or by hand. This may be effected by operating a worm $k$ mounted in brackets $k^2$ and gearing with a worm wheel on the axis of the feed roll projecting from the casing.

$l$ is the opening by which the materials are fed by the feed roll into the still.

In carrying out my invention I employ nitrate of soda and sulfuric acid which are thoroughly mixed by the mixer. This mixer is similar in construction to an ordinary pug-mill. It is not in itself novel, and any other form of mixer suitable to the purpose may be used instead. The finely pulped mixture of nitrate of soda and acid passes from the mixer into the pocket or compartment. This pocket has a temperature intermediate between that of the mixer and the first chamber of the still, which is such that while the heat tends to dissolve the nitrate in the acid there shall not be any considerable evaporation of the nitric acid. The hyponitric acid and chlorin produced from the impurities in the nitrate can then be conducted to any suitable condenser before collecting the nitric acid. This is an important advantage gained by the present invention, since by the methods previously used these gaseous impurities of necessity travel through the condensing apparatus contaminating more or less all the nitric acid produced. The mixture then flows from the pocket into the first chamber $a$ of the still where it boils and gives off large quantities of nitric acid contaminated more or less with hyponitric acid. These vapors are by the first still head continuously conducted to suitable condensers, and when condensed may be run into a stone jar. The mixture of sulfuric acid, nitrate and sulfate of soda, flows from chamber to chamber boiling incessantly and giving off pure nitric acid. The liquid contained in each successive compartment has therefore a less percentage of nitric acid and a higher percentage of sulfate of soda than in the preceding compartments. The nitric acid produced will be found to differ in density, the strongest being collected from the first still head and the weakest from the last. The mixture of sulfuric acid and sulfate of soda with the small remaining quantity of nitrate of soda or nitric acid flows into the last chamber of the still. Here the temperature is much higher than in the preceding compartments and the mixture boils vigorously giving off the remaining acid with vapors of water and some sulfuric acid. They are continuously conducted by the last still head to appropriate condensers. The continuous collection of these is a valuable feature of this process. In the ordinary method of producing nitric acid these vapors charged with excess of water and sulfuric acid pass through the same still head and some of the same condensing apparatus as had previously received the purer nitric acid given off during an earlier part of the process thus contaminating more or less all the nitric acid produced. This could not be avoided till the present continuous process had been invented.

The nitric acid made by the methods hitherto employed always contains traces of chlorin and of sulfuric acid and therefore has to be submitted to a separate process of rectification, but the acid produced by my process is found to be absolutely pure.

My process enables pure nitric acid to be produced without the costly processes of redistillation or rectification which are otherwise necessary.

What I claim as my invention is—

1. The described process of manufacturing nitric acid, which process consists in mixing nitrate of soda and sulfuric acid, passing the mixture successively through a series of heated compartments, collecting the vapors generated in each compartment and condensing the same, whereby nitric acid is continuously produced and distilled, as set forth.

2. The described continuous process for the production and distillation of nitric acid, said process consisting in mixing nitrate of soda and sulfuric acid, dissolving the former in the latter by heat, passing the liquid successively through a series of heated compartments, and collecting and condensing the vapors formed in the several compartments, as set forth.

3. The described continuous process for the production of nitric acid consisting in mixing nitrate of soda and sulfuric acid, dissolving by heat the former in the latter, passing the liquid successively through a series of compartments, subjecting the same in the last to a higher temperature than in the ones preceding and collecting separately and condensing the vapors produced in the different compartments, as set forth.

In testimony whereof I have signed my name to this specification in the presence of two subscribing witnesses.

MANNING PRENTICE.

Witnesses:
EDWARD C. HAMMOND,
WILLIAM F. UPTON,
*Both of 47 Lincoln's Inn Fields, London, W. C.*